United States Patent
Condon et al.

(10) Patent No.: US 7,766,515 B2
(45) Date of Patent: Aug. 3, 2010

(54) LIGHT SOURCE WITH NON-IMAGING OPTICAL DISTRIBUTION APPARATUS

(75) Inventors: Patrick Jeffery Condon, Morris, IL (US); Mark Bryan Pruss, Diamond, IL (US)

(73) Assignee: Dragonfish Technologies, LLC, Morris, IL (US)

( * ) Notice: Subject to any disclaimer, the term of this patent is extended or adjusted under 35 U.S.C. 154(b) by 370 days.

(21) Appl. No.: 11/407,627

(22) Filed: Apr. 20, 2006

(65) Prior Publication Data

US 2008/0130309 A1 Jun. 5, 2008

(51) Int. Cl.
*F21V 5/02* (2006.01)
*F21V 3/02* (2006.01)
*F21V 5/08* (2006.01)
*F21V 7/09* (2006.01)

(52) U.S. Cl. .................. 362/311.06; 362/339; 362/337; 362/522

(58) Field of Classification Search .................. 362/545, 362/546, 541, 522, 223, 339, 337, 311.06, 362/311.01, 311.02
See application file for complete search history.

(56) References Cited

U.S. PATENT DOCUMENTS

| | | | | | |
|---|---|---|---|---|---|
| 586,217 | A | * | 7/1897 | Basquin | 362/339 |
| 595,273 | A | * | 12/1897 | Soper | 362/339 |
| 1,579,855 | A | * | 4/1926 | Beyer | 362/540 |
| 1,671,086 | A | * | 5/1928 | Stimson | 362/339 |
| 1,874,138 | A | * | 8/1932 | Stimson | 362/540 |
| 3,267,278 | A | * | 8/1966 | Doolittle | 362/339 |
| 3,829,680 | A | * | 8/1974 | Jones | 362/339 |
| 4,177,505 | A | * | 12/1979 | Carel | 362/339 |
| 5,123,722 | A | * | 6/1992 | Meymand | 359/592 |
| 6,612,728 | B2 | * | 9/2003 | Roller et al. | 362/339 |
| 2005/0007793 | A1 | * | 1/2005 | Yoshida et al. | 362/339 |

FOREIGN PATENT DOCUMENTS

DE 3926618 A1 * 2/1991

* cited by examiner

*Primary Examiner*—Ismael Negron
(74) *Attorney, Agent, or Firm*—Boyle Fredrickson, S.C.

(57) ABSTRACT

A light transforming method and device that includes a lens having one or more specifically shaped surfaces designed to generate an output image by directing the appropriate amount of electromagnetic energy from a substantially collimated beam to the required regions of the output image for the purpose of recreating the output image. The lens has one or more non-imaging radiant energy distribution surfaces that is of a non-uniform. shape.

24 Claims, 12 Drawing Sheets

Stop Turn Tail Requirement

| | Minimum Lumens | Lens Efficiency + LED Warmup + Tooling Losses | Required energy before lens |
|---|---|---|---|
| Circular Pattern Average Fit | 26.000 | 0.600 | 43.333 |
| Circular pattern Good fit | 22.000 | 0.600 | 36.667 |
| Rectangular pattern Good Fit | 10.500 | 0.600 | 17.500 |

LIGHT SOURCE WITH NON-IMAGING OPTICAL DISTRIBUTION APPARATUS

FIELD OF THE INVENTION

The present invention relates generally to the redistribution of radiant, particularly an electromagnetic energy to achieve efficient and low cost products. More particularly, it relates to an apparatus and method for the efficient distribution of light energy into a pre-determined image pattern.

BACKGROUND OF THE INVENTION

Optical design for the distribution of electromagnetic radiation is generally broken down into two principal fields, imaging and non-imaging optics. (In this specification, "light" and "optical" comprise portions of the electromagnetic spectrum which include the visible spectrum and which may lie outside of the visible spectrum.) The field of imaging optics can be defined as the science of transferring electromagnetic energy from an object plane to an image plane with minimal distortion. The "object plane" or "input image" can be defined as a predetermined energy input distribution, while the "image plane" or "output image" can be defined as a predetermined energy output distribution which may vary in both intensity and direction.

Typically, imaging optical systems significantly attenuate the input image energy in the process of minimizing the output image's distortion. The degree to which the imaging optical system attenuates the energy transfer depends upon the application. However, in most instances there is a significant loss of electromagnetic energy by the time it reaches the image plane. This degree of energy attenuation is acceptable for applications, such as cameras, microscopes and the like. In contrast, when the application is an illumination system, the primary goal is to maximize the energy throughput of the optical system. Hence, the other field of optical design, non-imaging optics, is the science of maximizing the transfer of electromagnetic energy from a source image to an output image or from an object plane to an image plane.

There are many situations where electromagnetic energy is required to be distributed into a pre-determined output image and a high transfer of source energy is desirable. For example, overland vehicle safety lighting, aircraft lighting, street lamp lighting and marine lighting require specific output patterns determined by government regulations which can have minimum and maximum illumination values and which vary substantially in different directions. In each case, regulations typically specify minimal photometric requirements which must be met by the device. There are other applications where it would be desirable to project a highly even illumination onto a flat or complex surface or surfaces. This type of illumination would be very useful for many industrial purposes, but in the past, has been difficult or impossible to achieve.

The field of non-imaging optics has historically been confined to optics which, by definition, could not generate images. In past non-imaging solutions, designers used simplified surface geometry to approximate a desired output distribution resulting in non-optimal solutions which necessitated greater source energy and higher system power requirements. One common design technique associated with these solutions is to first collimate the source energy using a surface or multiple surfaces to form a relatively narrow angular output distribution and then re-distribute the collimated energy using a second output surface. Output surfaces in these typical collimated light solutions are comprised of a few simple shapes including ellipses, parabolas, radii, torroidal sections, multiple radii surfaces and swept or extruded combinations thereof.

By way of example FIG. 1 shows, in table form, a combination of various output values for SAE/DOT regulations for a stop turn tail lamp. As illustrated, the "output image" varies in both intensity and direction. Historically, the preferred energy source for these stop turn tail lamp devices was an incandescent lamp. Recent advances in technology have allowed light emitting diodes (LED's) to be employed as the source energy. LED's have many advantages over incandescent sources including; longer life, faster turn on times and lower energy consumption. The main disadvantage of LED sources is the cost which can be 10 times that of an incandescent lamp. The cost associated with these improved sources combined with the difficulty in achieving appropriate energy distribution when simplified optical geometries are employed, can make the use of LEDs cost prohibitive in many real world situations.

SUMMARY OF THE INVENTION

It is therefore an object of the present invention to provide an improved non-imaging optical distribution apparatus.

It is another object of the present invention to provide a means for shaping a pseudo-collimated beam into an accurately represented predetermined output image comprising one, either or both of, or a multiplicity of one, either or both of, a refractive surface and a reflective surface.

It is yet another object of the present invention to provide a method for generating a pre-defined image from a pseudo-collimated beam through the application of a non-absorbing image shaping surface designed to generate the output image by directing the appropriate quantity of electromagnetic energy to intended areas of the image.

It is a further object of the present invention to provide a higher efficiency and lower cost approach to the design of non-imaging optics.

It is a still further object of the present invention to provide a method to efficiently generate a high visibility information display on a projection surface.

It is still another object of the present invention to provide an efficient system to project advertisements or logos on a projection surface.

It is an additional object of the present invention to provide an efficient method to generate interior illumination systems such as even illumination reading lamps, area lighting and industrial lighting where a specific output image distribution is required.

It is yet a further object of the present invention to provide vehicle lights such as overland vehicle turn signals and stop lamps that are efficient and low cost.

It is another object of the present invention to provide a method for generating desired illumination intensities as projected on simple or complex surfaces.

These and other objects and advantages are achieved in a light transforming method and device that includes the use or creation of a lens having one or more specifically shaped surfaces designed to generate an output image by directing the appropriate amount of electromagnetic energy from a pseudo-collimated beam to the required regions of the output image for the purpose of recreating the output image. In accordance with the present invention, a light source such as an LED is collimated to produce the minimum spot size at the projection plane reasonably achievable and the pseudo-collimated light source impinges on the image shaping lens surface(s) and such that the light is redistributed in correct proportion and angle to generate the predetermined output image.

The field of non-imaging optics has historically been confined to optics which by definition could not generate projected images. Projected images were generated by attenuation of a field of light energy and focusing the field onto a projection surface. In the present invention, the shape of the image defining output surface is not limited to simple shape types, and therefore, the surface can be shaped to transform the input image directly into the desired output image. The image intensity variation is therefore not generated through attenuation as in an imaging optics, but rather by directing the appropriate amount of light energy to each area of the projected output image.

By analyzing the surface of the object to be illuminated ("projection surface") in accordance with the method of the present invention, it is possible to determine the required intensity field such that an even intensity distribution on the projection surface can be achieved even if the projection surface is complex in shape. In the event a non-uniform intensity distribution is desired to be projected onto a complex projection surface a similar analysis of the projection surface in accordance with the method of the present invention can be undertaken. Additional novel applications using the method of the present invention include but are not limited to, advertising displays and projected emergency warning messages. In advertising, search lamps can be modified using methods of the present invention to produce high power displays of company logos. Similarly, in accordance with the present invention, in an emergency lighting situation, a signal (e.g., an arrow or textual warning message) could be projected from a lamp onto an appropriate surface to provide dimensionally large high visibility information to direct people to exit or other safe locations.

The apparatus of the present invention includes a free-form surface shape such that when the energy distribution pattern exits the free-form surface the output image closely resembles the required output distribution pattern. The image generating surface of the present invention is defined by a multitude of triangular facets or a Polytrimorphic Surface (as described below) and is shaped through software optimization to generate a pre-determined angular output energy distribution. The Polytrimorphic surface is defined herein as a free-form surface defined by a multitude of triangularly bounded planes with boundaries oriented with the specific purpose of functionally providing a high degree of flexibility for subsequent morphing operations.

The present invention also provides a means of projecting specific patterns from a low profile warning device without the drawbacks of an imaging type projection system. In a hypothetical imaging system designed to project an arrow on a floor from a ceiling at 8 feet, the device would require a light source, a film plane and a focusing lens. The lens would be positioned to focus an image of the light at the film plane on the floor. Without the film, the projected image would ideally appear as an evenly lit circle. When the film is introduced into the system with an arrow image, the light outside the arrow pattern would be 100% attenuated and the light inside the arrow would be allowed to pass. The result is that in the example projected arrow pattern shown in FIG. 10 approximately 15% of the collected source energy would be transmitted to the floor and 85% would be wasted. Additional drawbacks of such an imaging system include large product dimensions; the requirement that the surface on which the signal is projected be perpendicular to the device axis; and the requirement that surface be at an exact focal distance. In comparison, the present invention requires approximately 1.5 inches or less of depth, is in focus at a wide range of distances and will distribute approximately 90% of the collimated energy into the required arrow distribution.

Similarly, applying the methods of the present invention to create a traditional LED stop-turn-tail lamp, results in a savings of approximately 50% over the most efficient products currently on the market. The optical efficiency improvement in the design of this improved LED-based product results in a more reliable product which produces less heat, has reduced electrical requirements, greater product life and significantly reduced cost than existing LED products. These benefits are not limited to just this product or type of source. The resulting total cost savings of the present invention will make the high performance LED lamps more accessible to the general public, improving vehicle safety and reliability.

BRIEF DESCRIPTION OF THE DRAWINGS

The subject matter, which is regarded as the invention, is particularly pointed out and distinctly claimed in the concluding portion of this specification. The invention, together with further objects and advantages thereof, may best be understood by reference to the following description taken in connection with the accompanying drawings.

DETAILED DESCRIPTION

Figure 1:
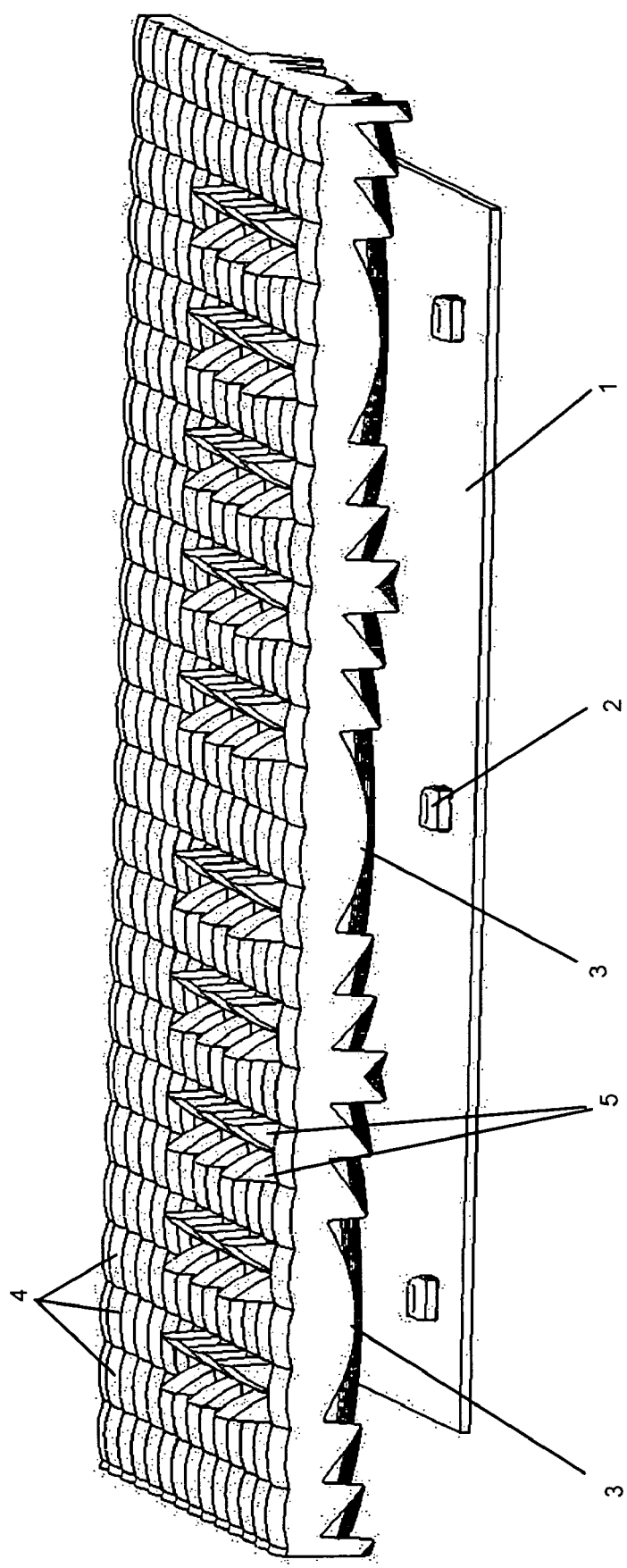
FIG. 1 is a cut away, side perspective view of a portion of stop turn tail lamp made in accordance with the present invention.

The present invention relates to an improved light shaping method and devices and lenses made therefrom. The lenses and devices made in accordance with the method of the present invention have wide ranging uses in various applications including portable lamps and specialty lighting, overland vehicles, watercraft, aircraft and manned spacecraft, automobiles, trucks, boats, ships, buses, vans, recreational vehicles, bicycles, motorcycles, mopeds, motorized cars, electric cars, airplanes, helicopters, space stations, shuttlecraft and the like; camping lanterns, head or helmet mounted lamps as used in mining or spelunking, hand-held flashlights and the like; advertising-use lamps (such as search lamps), street lighting, traffic lights, railroad signals, emergency lighting activated during power failures and information displays.

The present invention provides an energy efficient and highly accurate method for distributing pseudo-collimated electromagnetic radiation (light) into a pre-determined output image. Pseudo-collimated light can be generated from nearly any source including but not limited to incandescent lamps, LED's, arc and gas discharge lamps and lasers.

In a typical application of the present invention, light from a source such as an LED or incandescent lamp is collected and substantially collimated into a beam. The collimated beam will typically be comprised of a waveform with between 0 and 10 degrees between the peak intensity and the half intensity point. The waveform is preferably generally Gaussian in its angular distribution, however, a wide variety of beam profiles can be used with the sole requirement that the beam be substantially collimated. A device in accordance with the present invention has a beam that impinges on a free-form "Polytrimorphic" image generating surface. An iterative process, preferably carried out with a computer, is used to shape the Polytrimorphic free-form surface to form the pre-defined output image.

In order to create a device or lens of the present invention, it is first necessary to determine the parameters of the device, including the image and intensity to be projected, the surface on which the image is to be projected and the light source to be used. Once these parameters are ascertained an appropriate lens surface can be shaped by a wide variety of computerized lens optimization algorithms which look generally at the error contributed by each small portion of the surface to the output distribution and minimizing that error by modifying the area or angle of each contribution until an optimal shape is determined. These optimization processes require the application of shape limitation algorithms to constrain the range of output shapes to manufacturable parameters. The resulting optimized surfaces with these shape limiting algorithms represent locally minimal energy solutions to real world problems. The output from the surfaces generated by this family of optimization algorithms consists of closely matched intensity distributions with high efficiency energy transitions from a pseudo-collimated source with real world size and shape at critical image intensity transition points.

When the method of the present invention is applied to create an LED (light emitting diode) stop turn tail lamp for an overland vehicle, an approximate 50% power savings over the typical industry lamps on the market can be achieved. The product cost savings realized from the reduced power requirement extends to other vehicle systems resulting in improvements including; lighter wiring harnesses, smaller batteries, smaller generators, smaller alternators and reduced warranty claims.

Another application of the present invention is in the advertising industry where it is desired to project an image or a logo on a remote surface. By placing a refractive version of the invention into the beam path of a highly collimated source such as a search lamp, company logos or symbols may be projected onto remote surfaces such as clouds.

Another application of the present invention is the projection of specific intensity distributions on angled planes and complex surfaces. By calculating a proper image requirement, the present invention provides a degree of control which allows specific intensities to be efficiently projected on specific surfaces. Reading lamps, desk lamps and flood lights can be created which produce a more useful light distribution.

It should be noted that light having a greater degree of collimation when used with the present invention, produces a greater degree of resolution in the resulting image. If the collimated beam were shone on a surface such as a wall, it would generate a single spot having a diameter which is dependant on the collimation or beam expansion angle. In simple terms, each section of the surface (i.e., triangular face of the Polytrimorphic surface) acts to direct an image of this spot to an area of the requirement. An output image can be considered to consist of thousands or more of these spot images directed using the laws of refraction and reflection into the required pattern. Since a higher degree of collimation results in a smaller individual spot size, a sharper image can be generated. In the extreme form of this invention a collimated laser could be used to produce an extremely sharp image with very high resolution.

Manufacturing of a lens in accordance with the present invention may be accomplished through a variety of processes including but not limited to; injection molding, directly cutting the surface into transparent material and polishing the surface, or cutting directly into a substrate and plating it with a reflective coating. Since the full detail of the Polytrimorphic surface is very difficult to replicate perfectly by any currently available manufacturing process, the actual manufactured surface is an approximation of the theoretical designed surface. The surface, therefore, can be depicted or generated using any of several parametric and non-parametric surface definition types including, but not limited to, non-uniform rational b-spline surfaces (NURBS), high order polynomial fits, and Bezier spline surface types with minimal effect on the resulting device performance. These parametric surfaces may be continuous in nature without the discontinuities which are present in the actual design of every Polytrimorphic surface. The resulting parametric surface or surfaces may be continuously differentiable and represent a highly functional approximation of the Polytrimorphic surface. Although some approximation error is acceptable, care should be taken to achieve a sufficiently accurate model and finished component to come as close as possible to the theoretical output performance.

A wide variety of computational algorithms can be used to generate the surface shape of the lens. In using such algorithms, particular attention should be paid to the percent transmission of the light at higher angles of incidence and the distortion of the output beam shape at high angles of incidence to the surface normal. The algorithm should also be constrained in an appropriate manner such that actual manufacturable surfaces are generated.

Figure 9:
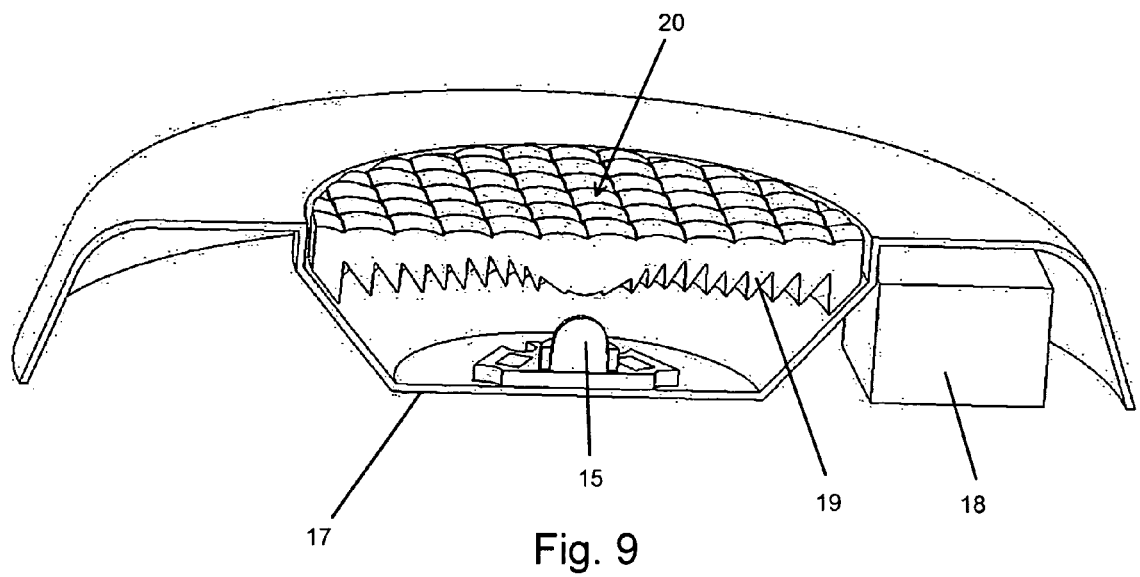
FIG. 9 is a side cross-sectional view of an emergency arrow lamp assembly in accordance with the present invention.
Figure 14:
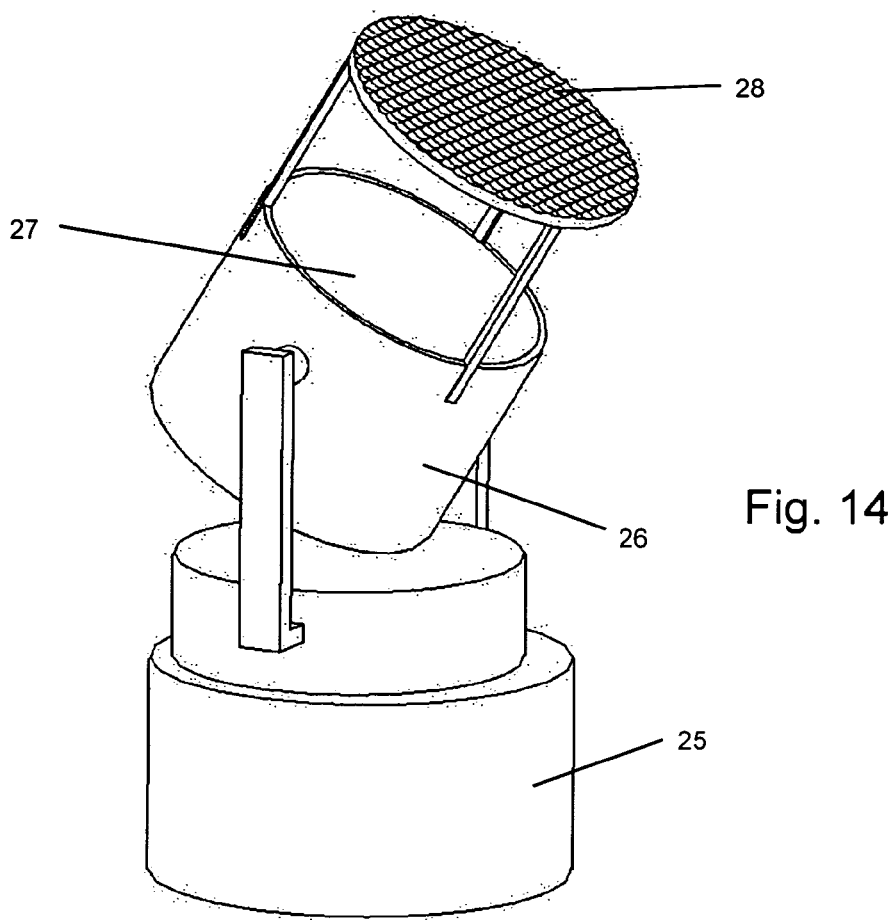
FIG. 14 is a view of an illumination assembly whereby refractive distribution optics are placed in the beam path of a highly collimated search lamp.

FIGS. 1, 9 and 14 show three different devices made in accordance with the present invention. FIG. 1 depicts a multiple LED source construction where the lens is configured to project the regulated stop turn tail pattern. FIG. 9 depicts a single very high power LED source construction where the lens is configured to project an emergency direction arrow onto a surface. Finally, FIG. 14 depicts a search lamp construction where the lens is configured so as to distribute the search lamp output into a predetermined output pattern.

Referring to FIG. 1, multiple LED sources 2 are placed on a typical circuit board substrate 1. The LED sources may, for example, be Sylvania Osram Power Top LED surface mount devices designed to emit a minimum flux of 3.5 Lumens of red light in a hemispherical Lambertian cosine pattern. The circuit board 1 provides the mechanical support, heat dissipation, power regulation circuitry and electrical conduits to energize the LED sources 2. The light energy from the LED sources 2 is collected and collimated by the collimation surfaces 3 and directed upward toward the refractive and reflective surfaces 4 and 5 of the present invention (hereinafter "Polytrimorphic" refractive and reflective surfaces). In the stop turn tail embodiment of FIG. 1, the Polytrimorphic refractive surfaces 4 direct the light into the pattern requirement from plus 20 degrees to minus 15 degrees vertically and plus 20 degrees to minus 20 degrees horizontally. The Polytrimorphic refractive surfaces 4 are convex in shape to prevent emitted light from intersecting the protruding Polytrimorphic reflective surfaces 5 which extend above the smaller Polytrimorphic refractive surfaces 4. It should be noted that the refractive and reflective surfaces in this drawing are shown in a parametric cubic NURBS format and not as true Polytrimorphic surfaces because the shapes are functionally optically equivalent and cubic NURB surfaces are more suitable for current computerized manufacturing equipment.

Figure 2:
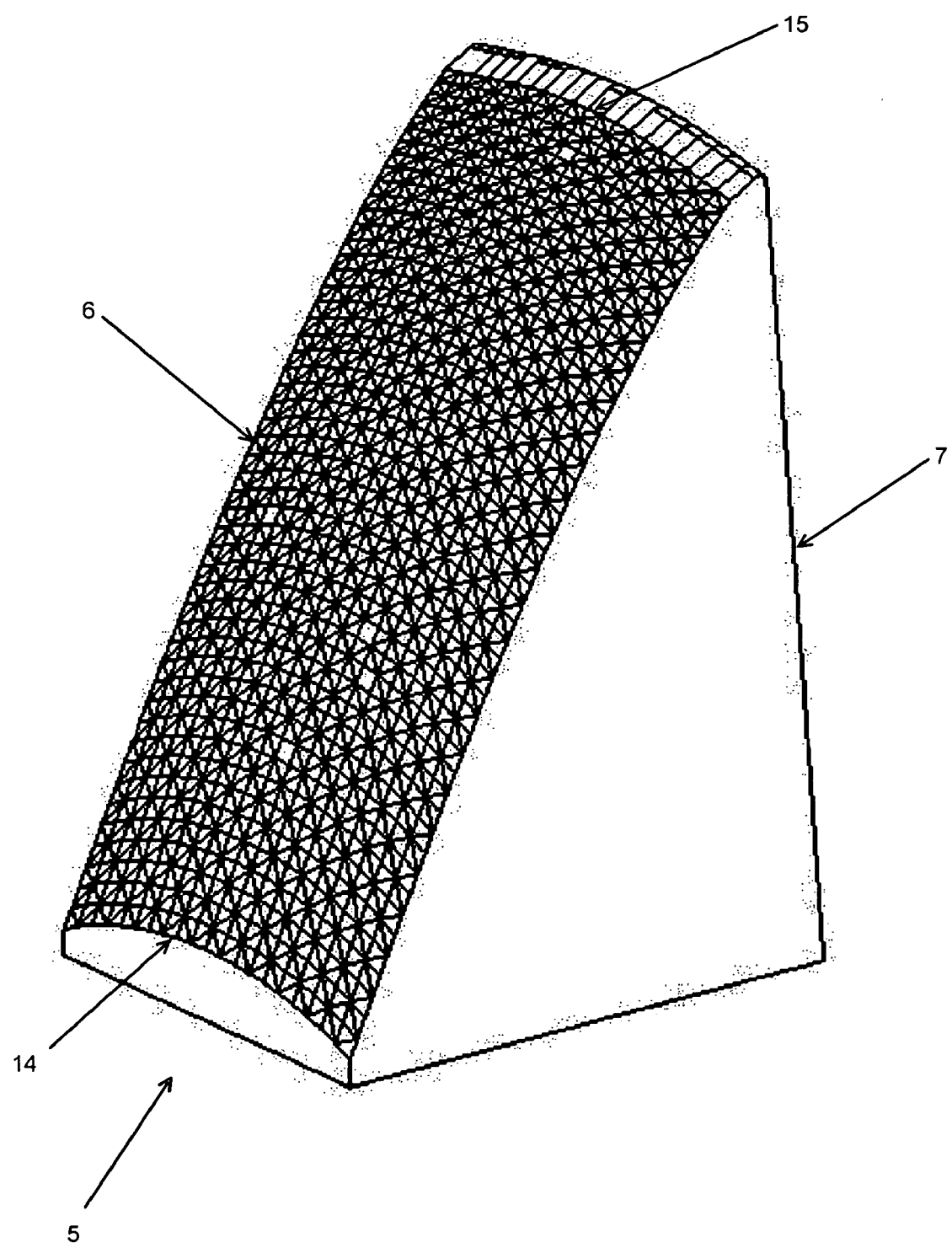
FIG. 2 is an enlarged perspective view of a single Polytrimorphic reflective surface element 5 from FIG. 1 where the optic element shapes the image by internal reflection.

FIG. 2 is a computer generated drawing of a Polytrimorphic reflective surface element. The complex Polytrimorphic free-form surface is designed to project the light energy into the pattern shown in FIG. 5 from an angle of minus 20 to minus 80 and plus 20 to plus 80 horizontally and plus 20 to minus 15 degrees in the vertical direction. This reflective feature 6 of the present invention operates on the principle of total internal reflection (TIR). More particularly, when light strikes a surface at an angle to the surface normal greater than the critical angle, 100% of the light energy reflects and remains inside the [material]. In the lenses of the present invention, the angle of reflection of each triangular plane comprising the surface is oriented to produce the required intensity for the target pattern after exiting the surface 7.

Figure 3:
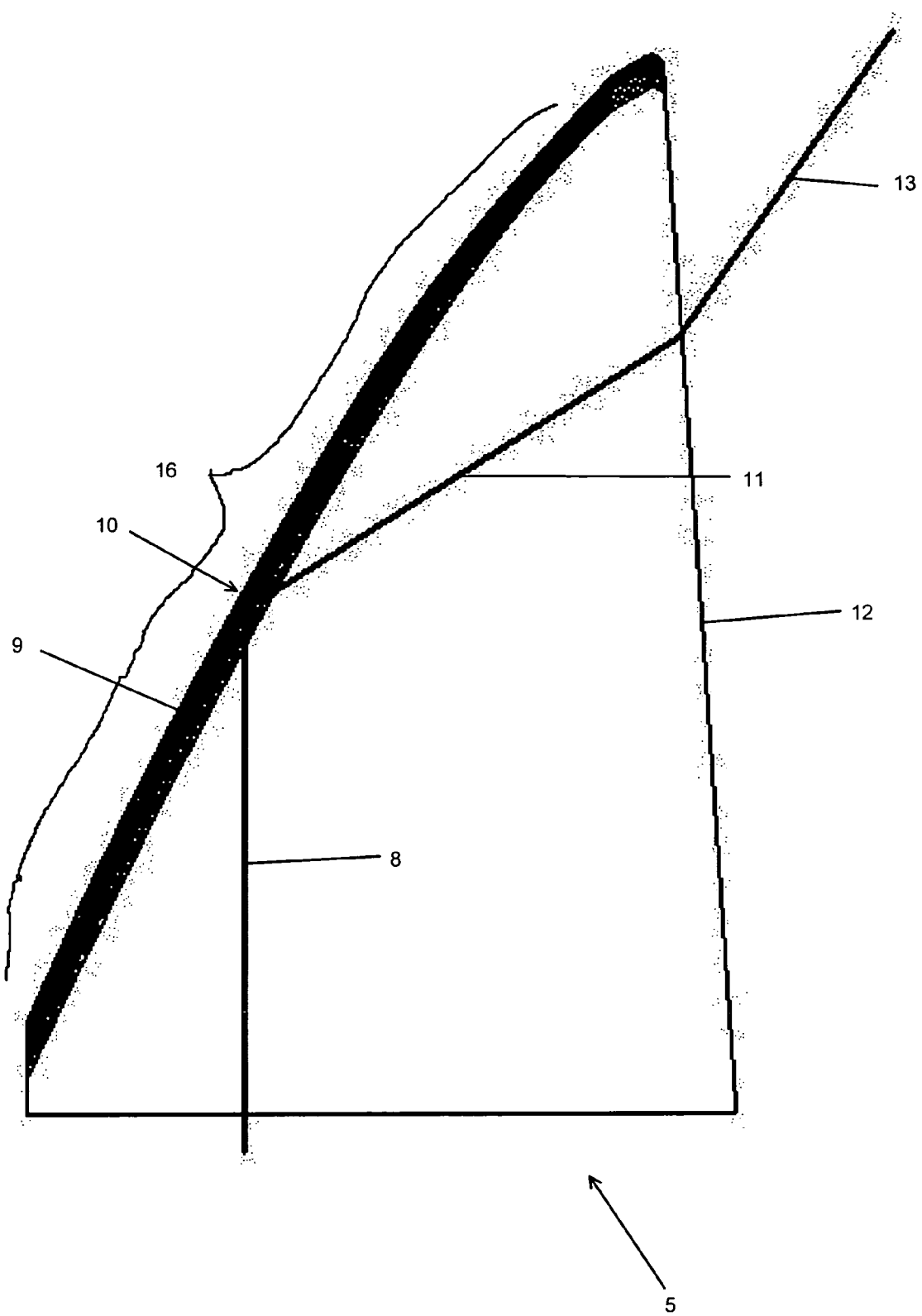
FIG. 3 shows a side view of the single Polytrimorphic reflective surface element from of FIG. 2 depicting the path of a typical ray passing through the element.

FIG. 3 depicts the path of a typical ray through an internally reflective element 5 employed in the FIG. 1 embodiment. The typical collimated ray 8 is shown entering the reflective element 5 in its nominal vertical direction. The ray intersects the complex non-uniform shape of surface 9 at a point indicated 10. Since in this case the ray is beyond the critical angle from the surface normal, total internal reflection occurs and 100% of the energy is reflected on path 11. This reflected ray 11 intersects the outer surface of the material 12 and refracts away from surface normal along path 13 [into the required pattern].

The non-uniform shape of the reflective elements is visible as a difference in curvature between 14 and 15 shown in FIG. 2 which is also shown in FIG. 3 as 16. The angle and therefore the curvature of the surface is varied using the physical laws of refraction and reflection entirely based upon the energy input and the energy of the required output image shown in FIG. 5.

Figure 4:
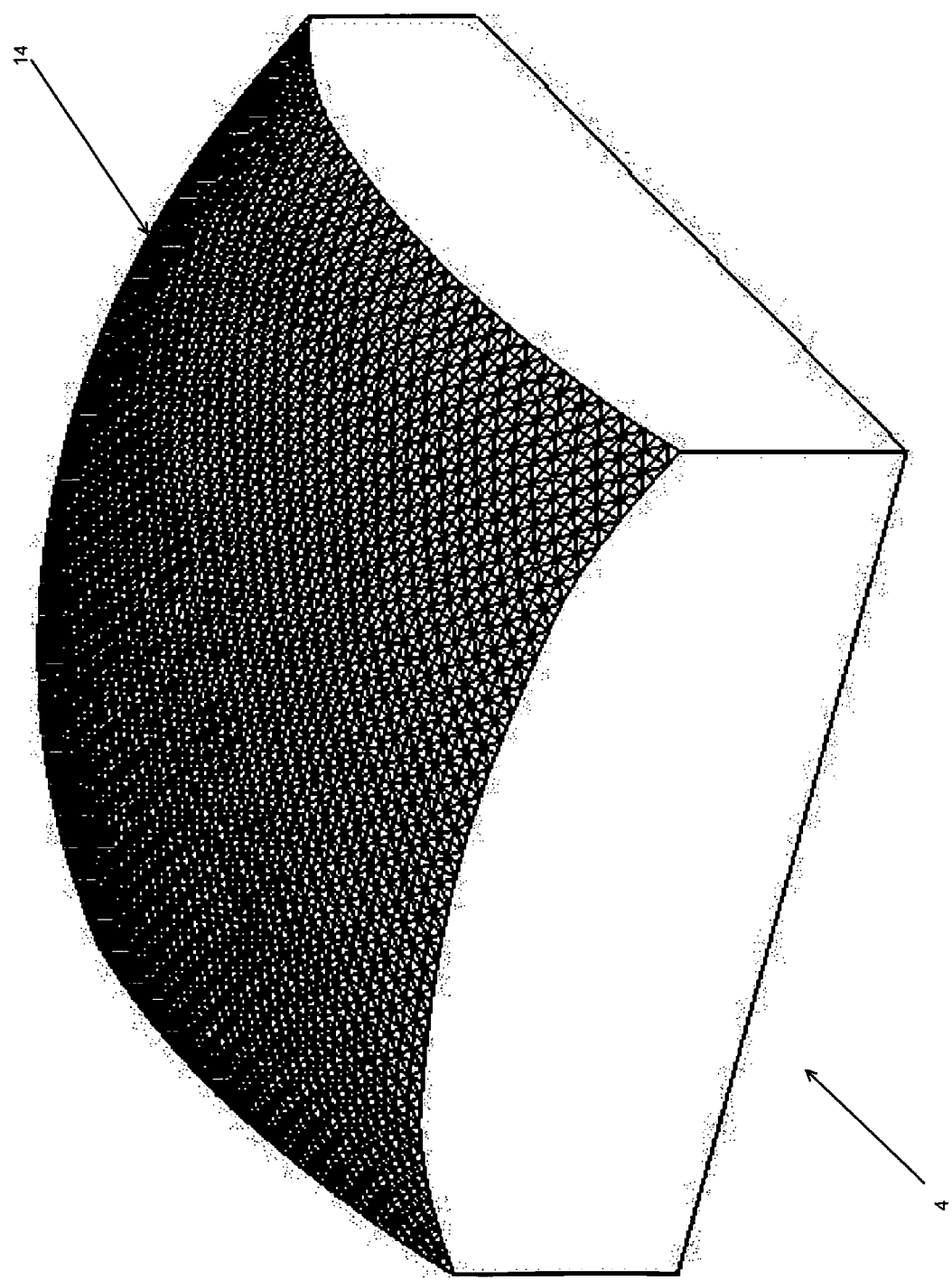
FIG. 4 is a close up view of a single Polytrimorphic refractive surface element from FIG. 1 where the optic element is designed to make the center 20 degrees of a stop turn tail lamp pattern.

FIG. 4 is an enlarged view of a single refractive element 4 shown in FIG. 1. The surface shape of 14 is visibly non-uniform and contains both gradual curvatures and sharp discontinuities. An automated and iterative algorithm is used to generate the shape in FIG. 4 to meet a portion of the requirement shown in FIG. 5. As is the case with the reflective elements, all curvatures and discontinuities of FIG. 4 are a direct result of the input and output energy requirements and discontinuities in the image shown in FIG. 5. The refractive element 4 generates the central portion of the image shown in FIG. 5 from minus 20 to plus 20 degrees horizontal and minus 15 to plus 20 degrees vertical. The reflective elements 5, shown in FIG. 2 and FIG. 3, are used to generate the more extreme angles from 20 to 80 degrees horizontally as shown in FIG. 5 for the rest of the pattern.

Figure 5:
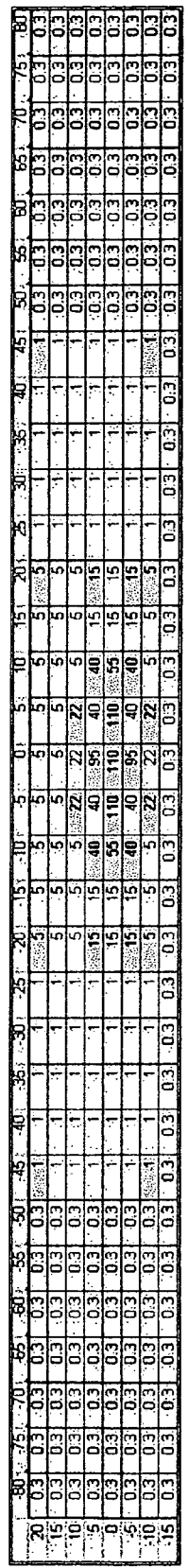
FIG. 5 is a sample table depicting the required design output values as derived from US DOT SAE regulations for the stop turn tail lamp. The requirement is a combination of multiple regulations.

FIG. 5 is a table representing the current United States Department of Transportation specification for the output of a multi-compartment narrow vehicle stop lamp (FMVSS108). The top row and left column of the table represent degrees from the center axis horizontally and vertically. Up in the table (from 0) represents light angled upward from the lamp while down in the table (from 0) represents light angled downward. Left in the table (from 0) represents light angled left from the lamp while right in the table (from 0) represents light angled right from the lamp. The values in the table to the right of the left column and below the top row represent the Candelas required by the U.S. government specification at each stated angular position.

Figure 6:
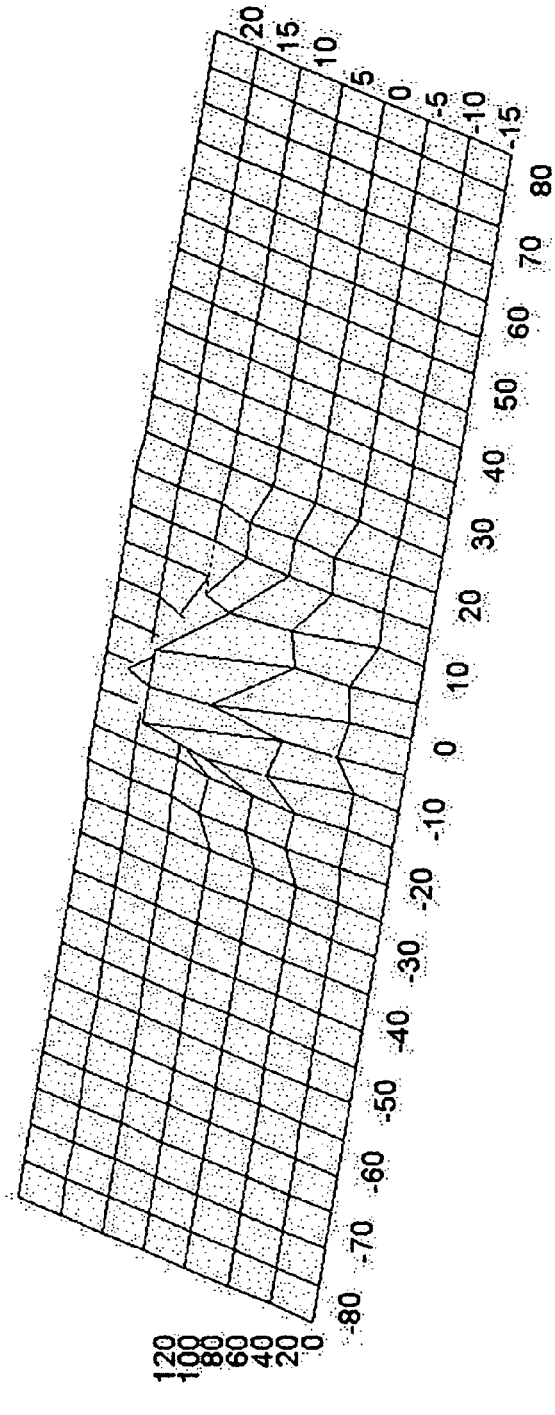
FIG. 6 is a graph of the table in FIG. 5 required output for the Stop, Turn Tail lamp.
Figures 7, 8:
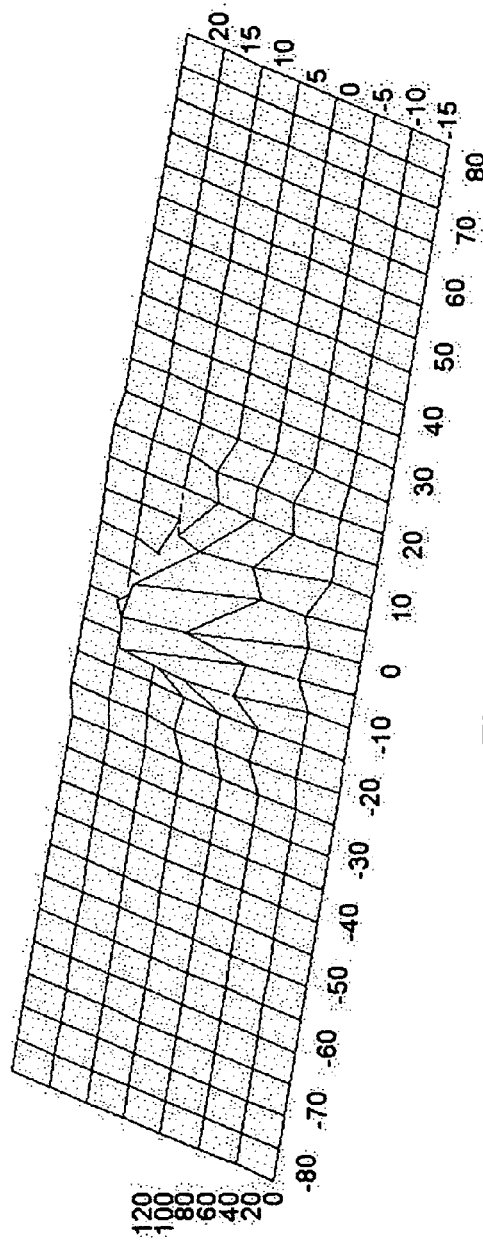
FIG. 7 is a graph of the output of the lens system shown in FIG. 1.
FIG. 8 is a table comparing the energy requirement of the lens shown in FIG. 1 to standard lens designs.

FIG. 6 is a three dimensional plot of the data shown in FIG. 5 which is the requirement for the stop turn tail light. The vertical height of the graph in FIG. 6 is measured in Candelas and depicts the required minimum intensity FIG. 5. The longer axis is in degrees as measured horizontally for the light and the remaining shorter axis represents vertical degrees. FIG. 7 is a graph of the actual output from the device shown in FIG. 1. As can bee seen, the graph very closely matches the required data of FIG. 6 and gives a strong indication of how well the surface curvatures and discontinuities match the output requirement.

FIG. 8 is a table representing the calculated lumens required for three different design approaches for a stop turn tail lamp. The row labeled "Circular pattern average fit" requires 43 lumens of output power to meet the FIG. 5 table requirements. This is the standard performance level for many of today's stop turn tail systems targeted to meet the requirement in FIG. 5. The FIG. 8 row labeled "Circular pattern good fit" represents the use of a highly optimized 2 dimensional profile revolved in a circle to generate the requirement in FIG. 5. This technique, however, still requires 36.7 Lumens of source light power to meet the requirement. The FIG. 8 row titled "Rectangular pattern good fit" represents the performance of the present invention as applied to a stop turn tail lamp. It requires only 17.5 lumens [before the lens] to meet the United States government specification. If each LED is expected to produce a minimum of 3.5 Lumens output then 5 LED devices are required to meet the minimum requirement in a device built in accordance with the present invention. This is in contrast to the requirement of the "Circular Pattern average fit" lamp that requires 13 3.5 Lumen LEDs and the requirement of even the "Circular Pattern good fit" lamp that requires 11 3.5 Lumen LEDs.

In accordance with one embodiment of the present invention which is directed to a vehicle stop lamp, light from a light source having a total output of less than 30 Lumens, is directed and distributed through a lens to achieve a predetermined output intensity distribution such that the sum of the intensity measurements at:

5 degrees up, 0 degrees left,
5 degrees down, 0 degrees left,
0 degrees up, 5 degrees left,
0 degrees up, 0 degrees left, and
0 degrees up, 5 degrees right;
is greater than 380 Candelas; and
The sum of the intensity measurements at:
5 degrees up, 10 degrees left,
0 degrees up, 10 degrees left, and
5 degrees down, 10 degrees left;
is greater than 100 Candelas; and
The sum of the intensity measurements at:
5 degrees up, 10 degrees right,
0 degrees up, 10 degrees right, and
5 degrees down, 10 degrees right,
is greater than 100 Candelas; and
The sum of the intensity measurements at:
10 degrees up, 5 degrees left,
5 degrees up, 20 degrees left,
5 degrees down, 20 degrees left, and
10 degrees down, 5 degrees left,
is greater than 50 Candelas; and
The sum of the intensity measurements at:
10 degrees up, 5 degrees right,
5 degrees up, 20 degrees right,
5 degrees down, 20 degrees right, and
10 degrees down, 5 degrees right,
is greater than 50 Candelas.

This distribution conforms to the current United States Department of Transportation specification for the output of a single compartment vehicle stop lamp (FMVSS 108).

In accordance with another embodiment of the present invention which is directed to a vehicle single compartment front amber turn signal, light from a light source having a total output of less than 150 Lumens is directed and distributed through a lens to achieve a predetermined output intensity distribution such that the sum of the intensity measurements at:
5 degrees up, 0 degrees left,
5 degrees down, 0 degrees left,
0 degrees up, 5 degrees left,
0 degrees up, 0 degrees left, and
0 degrees up, 5 degrees right;
is greater than 1900 Candelas; and
The sum of the intensity measurements at:
5 degrees up, 10 degrees left,
0 degrees up, 10 degrees left, and
5 degrees down, 10 degrees left;
is greater than 500 Candelas; and
The sum of the intensity measurements at:
degrees up, 10 degrees right,
0 degrees up, 10 degrees right, and
5 degrees down, 10 degrees right,
is greater than 500 Candelas; and
The sum of the intensity measurements at:
degrees up, 5 degrees left,
5 degrees up, 20 degrees left,
5 degrees down, 20 degrees left, and
10 degrees down, 5 degrees left,
is greater than 260 Candelas; and
The sum of the intensity measurements at:
10 degrees up, 5 degrees right,
5 degrees up, 20 degrees right,
5 degrees down, 20 degrees right, and
10 degrees down, 5 degrees right,
is greater than 260 Candelas.

This distribution pattern conforms to the current United States Department of Transportation specification for the output of an amber single compartment front turn signal (FMVSS 108).

In accordance with yet another embodiment of the present invention which is directed to an single compartment amber rear turn signal, light from a light source having a total output of less than 50 Lumens is directed and distributed through a lens to achieve a predetermined output intensity distribution such that the sum of the intensity measurements at:
5 degrees up, 0 degrees left,
5 degrees down, 0 degrees left,
0 degrees up, 5 degrees left,
0 degrees up, 0 degrees left, and
0 degrees up, 5 degrees right;
is greater than 590 Candelas; and
The sum of the intensity measurements at:
5 degrees up, 10 degrees left,
0 degrees up, 10 degrees left, and
5 degrees down, 10 degrees left;
is greater than 165 Candelas; and
The sum of the intensity measurements at:
5 degrees up, 10 degrees right,
0 degrees up, 10 degrees right, and
degrees down, 10 degrees right,
is greater than 165 Candelas; and
The sum of the intensity measurements at:
10 degrees up, 5 degrees left,
5 degrees up, 20 degrees left,
5 degrees down, 20 degrees left, and
10 degrees down, 5 degrees left,
is greater than 84 Candelas; and
The sum of the intensity measurements at:
10 degrees up, 5 degrees right,
5 degrees up, 20 degrees right,
5 degrees down, 20 degrees right, and
10 degrees down, 5 degrees right,
is greater than 84 Candelas.

This distribution pattern conforms to the current United States Department of Transportation specification for the output of a single compartment rear facing amber turn signal (FMVSS 108).

Figure 10:
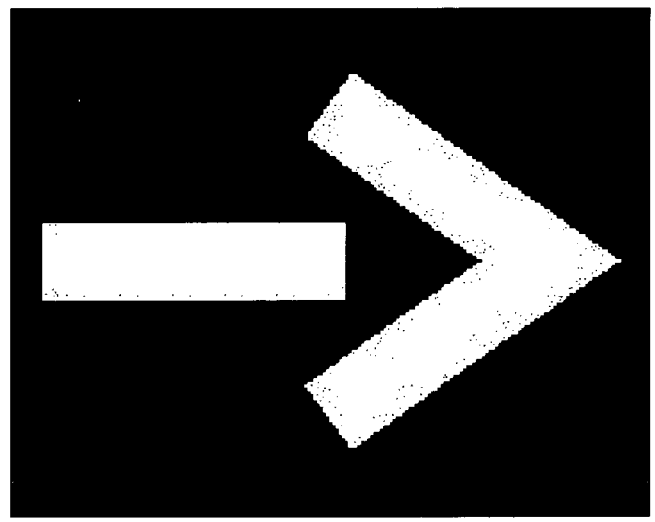
FIG. 10 is a graph of the target requirement for the emergency arrow

The device shown in FIG. 9 is that of an emergency warning device made in accordance with the present invention designed, in this embodiment, to project an arrow (as shown in FIG. 10) on a surface oriented parallel to the mounting surface. The arrow is approximately 3 feet from tip to tail as projected on a floor with the device mounted on a ceiling 8 feet from the floor. The device includes a high power LED source 15 available through Lumileds which produces over 60 Lumens at its normal drive current of 350 mA. Because of the intensity of the LED, the device requires a heat sink to transfer heat away from the device. This is accomplished via a metal stamping which, in this embodiment, serves as a housing 17 for the components. Preferably, the LED device is controlled and powered by electronics which are sealed to protect against moisture in a control box 18. The unit also preferably incorporates a backup power supply in the form of a rechargeable battery (not shown) mounted on the opposite side of the unit.

As discussed previously, it is preferable to project the smallest spot attainable from the collimator on the surface or in the direction required. In the embodiment shown in FIG. 9, this is preferably achieved by focusing the collimator energy on a spot at a set distance rather than achieving the best possible collimation. Placing the emphasis on focusing the energy on a spot at a set distance for short range projection devices produces the sharpest possible image. In the case of the emergency arrow example, this modification will preferably reduce the output spot size resulting in a sharper arrow image.

Figure 11:
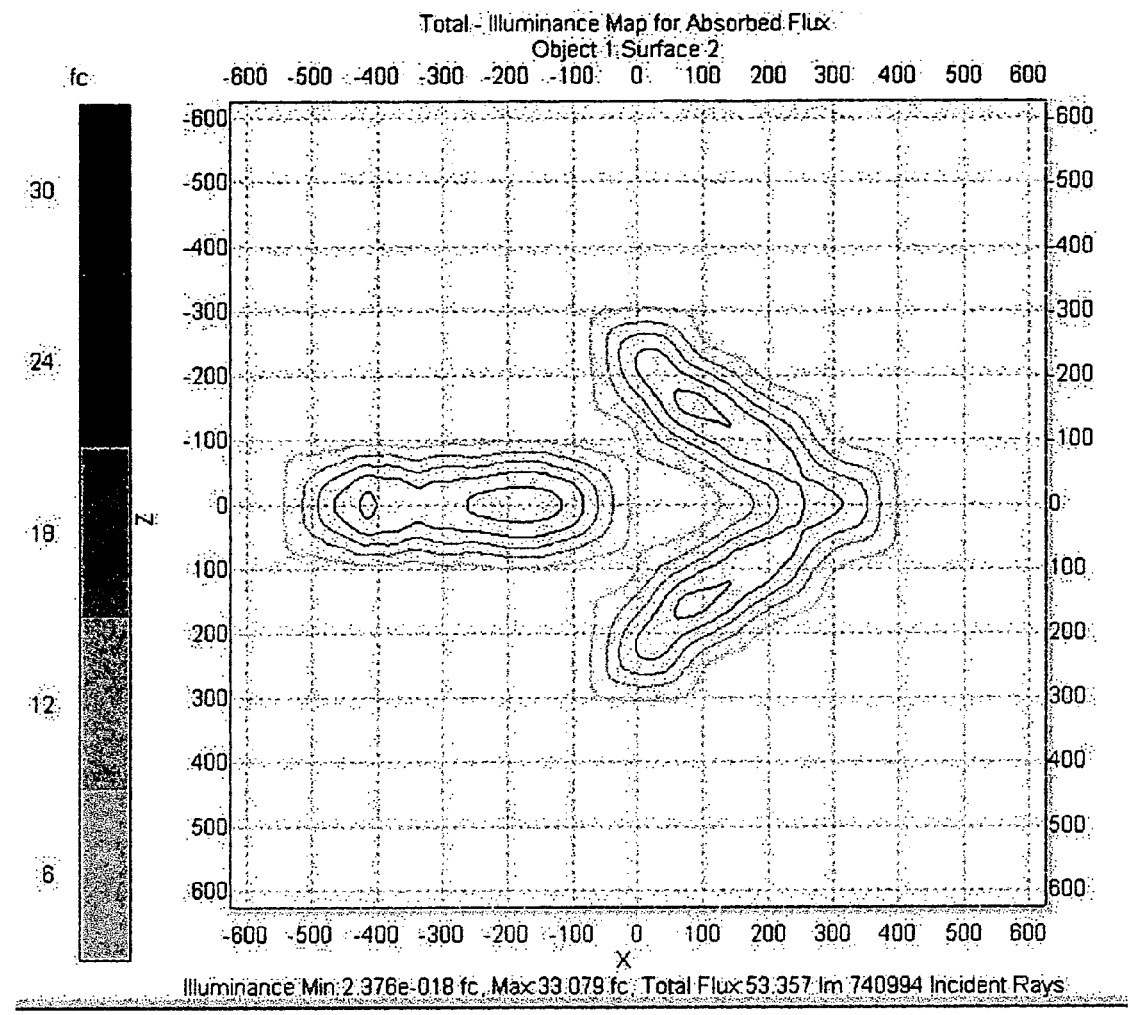
FIG. 11 is a plot of the anticipated output as determined by a commercial raytrace package. The output depicts the performance of the arrow lens when projected on a surface 8 ft from the source. The axes of the output graph are in millimeters.

In FIG. 9, light output by the LED source 15 is collected and collimated by the faceted optic 19 and directed upward towards the polytrimorphic surface 20 of the present invention. A narrower beam collimation angle produces a sharper and higher definition output pattern. In this embodiment, if surface 20 was designed to be perfectly flat, the light would project a small spot approximately 4 inches in diameter on a surface at a distance of 8 feet. When the actual surface 20 is introduced into the collimated beam it generates the arrow in FIG. 11. The differences between the intended (ideal) output, as shown in FIG. 10, and the actual output shown in FIG. 11 are caused by the expansion angle of the collimated source beam. In other words, if a light source having a higher degree of collimation than that in the embodiment of FIG. 9 were employed, it would be possible to improve the correlation between the ideal output and the actual output.

Figure 12:
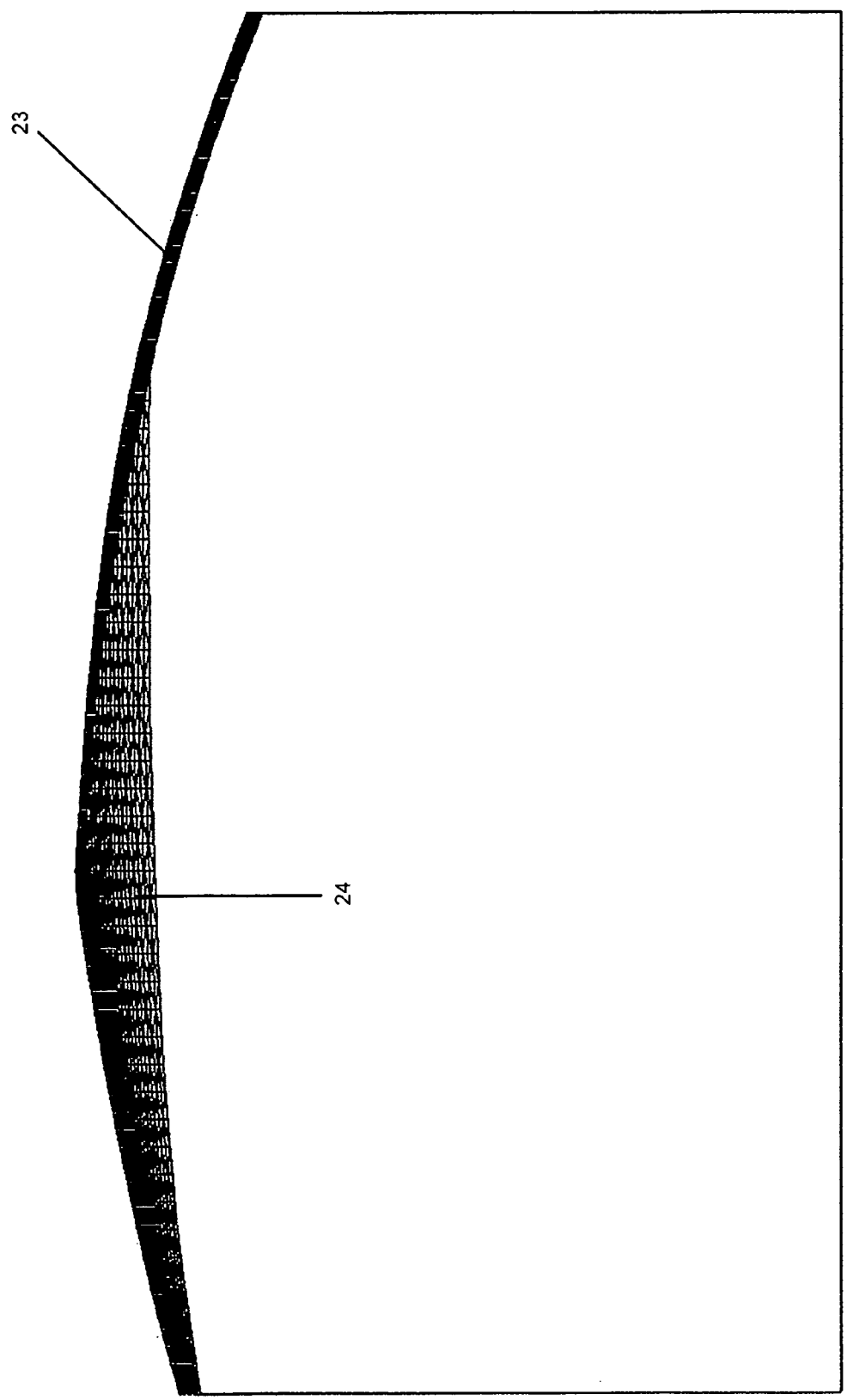
FIG. 12 is a side view of the irregular surface of element 20 in FIG. 9 used to create the arrow image in FIG. 11
Figure 13:
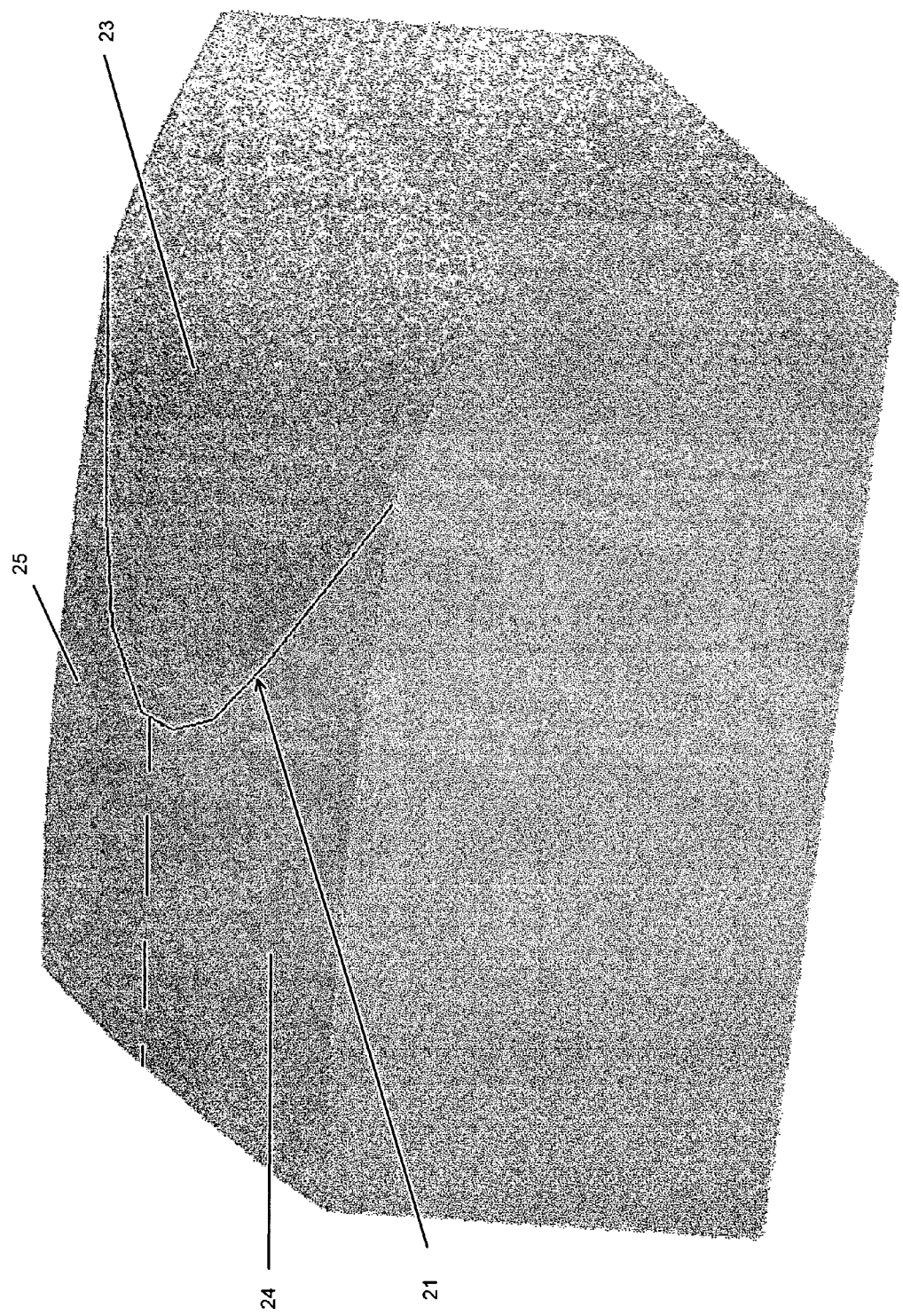
FIG. 13 is a perspective view of the irregular surface of element 20 in FIG. 9 used to create the arrow image in FIG. 11

FIGS. 12 and 13 show a detailed view of one of the individual refractive elements 20 of FIG. 9. The repetition of this configuration across the collimator (lens) surface causes the generation of an arrow. Close examination of this complex non-uniform surface shape reveals gradual curvatures and sharp discontinuities. The discontinuities are most visible at arc 21. These discontinuities represent the line of demarcation between the section 23 designed to create the body of the arrow and the two sections 24 and 25 designed to create the opposite sides of the head of the arrow.

Figure 15:
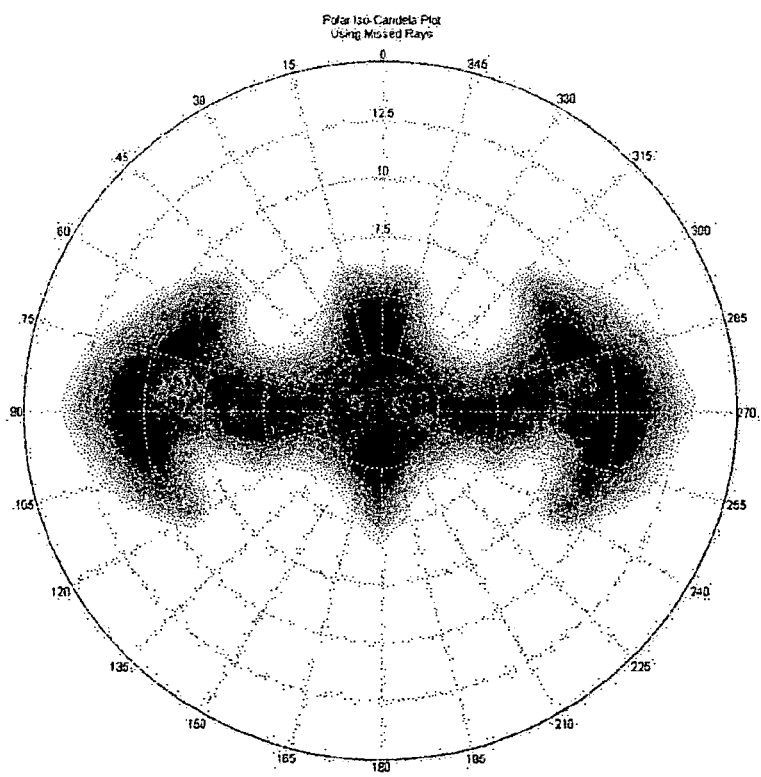
FIG. 15 represents a "bat shaped" output from a commercial raytrace package of the refractive lens placed into the beam path of the search light.
Figure 16:
FIG. 16 is an image of a Siamese cat taken from a digital camera
Figure 17:
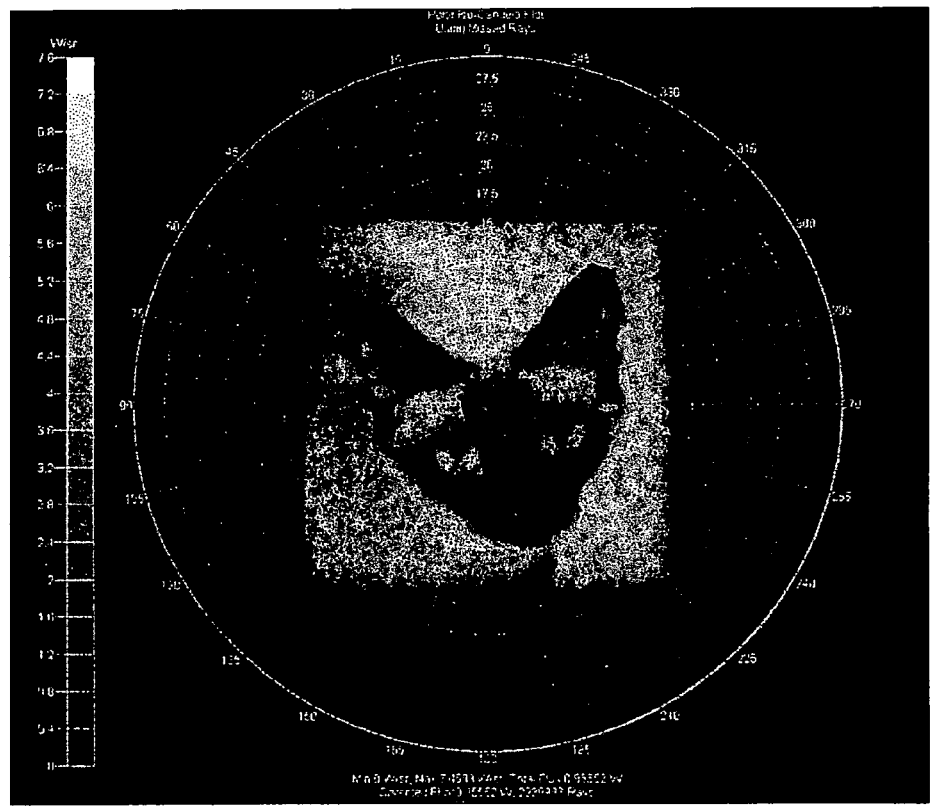
FIG. 17 is an actual output image of a Siamese cat from a Polytrimorphic surface made in accordance with the present invention.

FIG. 14 depicts another embodiment of the present invention intended for use as an advertising tool. The collimated source in this embodiment is a search lamp. The lamp housing 26 is mounted on the gimbal and base 25. The light is collimated by a parabolic reflector 27 and projected upward through the distribution lens 28 which directs the light into a pattern, one example being shown in FIG. 15. The lens in this embodiment is preferably machined directly into a PMMA (acrylic) sheet that is mounted at a safe distance from the lamp to prevent heat related failure of the sheet. Higher power lamps require placement of the lens sheet at greater distance from the lamp. The collimator section may also include infrared absorption coatings or a coated glass window (heat window) (not shown) over the source in order to reduce heating of the lens sheet 28. FIGS. 15-17 are examples of output images achieved through the use of the present invention that demonstrate the invention's overall uniqueness. FIG. 15 is a representative output of a lens shaped to produce a "bat shaped" logo as in the comic book saga of Batman. Previously, such an output distribution would have been achieved by masking the output of a light source with a bat shape. However, such masking would have resulted significant source attenuation. The present invention permits the creation of a well defined complex bat shape, at virtually any predetermined distance with minimal source attenuation. Similarly, FIG. 16 is a complex energy distribution example image of a Siamese cat taken from a digital camera which has been converted into a requirement distribution for a lens. A lens was generated using a collimated Sylvania Osram LED to a very narrow collimation angle. The lens element was refractive in nature and the output image was designed to be approximately −15 to 15 degrees both horizontally and vertically. FIG. 17 is an actual output from the lens as predicted by a commercial ray trace software package. The rings of the graph are shown in degrees. The slight defocusing of the lens is due to the physical angular size of the collimated source.

The present invention may be implemented in a variety of configurations, using certain features or aspects of the several embodiments described herein and others known in the art. Thus, although the invention has been herein shown and described in what is perceived to be the most practical and preferred embodiments, it is to be understood that the invention is not intended to be limited to the specific features and embodiments set forth above. Rather, it is recognized that modifications may be made by one of skill in the art of the invention without departing from the spirit or intent of the invention and, therefore, the invention is to be taken as including all reasonable equivalents to the subject matter disclosed herein.

The invention claimed is:

1. A device for creating a predetermined light output image distribution comprising:
   a light source that emits light;
   a lens comprising a plurality of lens elements and collimation surfaces, wherein the collimation surfaces at least substantially collimate light emitted by the light source, and wherein said lens has a non-imaging radiant energy distribution surface defined by the plurality of lens elements that directs the collimated light into a predetermined output image distribution, and wherein at least one of the lens elements has a complex non-uniform shape, when sectioned along an axis generally parallel to an optic axis for the at least one lens element, and which can be generally represented by a continuous and smooth surface.

2. A device according to claim 1, wherein the light source comprises at least one LED.

3. A device according to claim 1, wherein the output image distribution conforms to at least one light specification defined in United States Department of Transportation specification FMVSS 108.

4. A device according to claim 1, wherein the light output image distribution projects a complex recognizable shape having no distinct focal point onto a second surface.

5. A device according to claim 1, wherein the light source is red as defined by United States Department of Transportation specification FMVSS 108.

6. A device according to claim 1, wherein the light source is amber as defined by United States Department of Transportation specification FMVSS 108.

7. A device according to claim 1 wherein:
   the light source has a total output of less than 150 Lumens;
   and wherein the sum of the intensity measurements at:
   5 degrees up, 0 degrees left,
   5 degrees down, 0 degrees left,
   0 degrees up, 5 degrees left,
   0 degrees up, 0 degrees left, and
   0 degrees up, 5 degrees right;
   is greater than 1900 Candelas; and
   the sum of the intensity measurements at:
   5 degrees up, 10 degrees left,
   0 degrees up, 10 degrees left, and
   5 degrees down, 10 degrees left;
   is greater than 500 Candelas; and
   the sum of the intensity measurements at:
   5 degrees up, 10 degrees right,
   0 degrees up, 10 degrees right, and
   5 degrees down, 10 degrees right,
   is greater than 500 Candelas; and
   the sum of the intensity measurements at:
   10 degrees up, 5 degrees left,
   5 degrees up, 20 degrees left,
   5 degrees down, 20 degrees left, and 10 degrees down, 5 degrees left,
is greater than 260 Candelas; and
the sum of the intensity measurements at:
10 degrees up, 5 degrees right,
5 degrees up, 20 degrees right,
5 degrees down, 20 degrees right, and
10 degrees down, 5 degrees right,
is greater than 260 Candelas.

8. A device according to claim 7, wherein the light from the source is pseudo collimated light.

9. A device according to claim 7, wherein the light source has an output of less than about 130 lumens.

10. A device according to claim 9, wherein the light source has an output of less than about 110 lumens.

11. A device according to claim 1 wherein:
the light source has a total output of less than 50 Lumens;
and wherein the sum of the intensity measurements at:
5 degrees up, 0 degrees left,
5 degrees down, 0 degrees left,
0 degrees up, 5 degrees left,
0 degrees up, 0 degrees left, and
0 degrees up, 5 degrees right;
is greater than 590 Candelas; and
the sum of the intensity measurements at:
5 degrees up, 10 degrees left,
0 degrees up, 10 degrees left, and
5 degrees down, 10 degrees left;
is greater than 165 Candelas; and
the sum of the intensity measurements at:
5 degrees up, 10 degrees right,
0 degrees up, 10 degrees right, and
5 degrees down, 10 degrees right,
is greater than 165 Candelas; and
the sum of the intensity measurements at:
10 degrees up, 5 degrees left,
5 degrees up, 20 degrees left,
5 degrees down, 20 degrees left, and
10 degrees down, 5 degrees left,
is greater than 84 Candelas; and
the sum of the intensity measurements at:
10 degrees up, 5 degrees right,
5 degrees up, 20 degrees right,
5 degrees down, 20 degrees right, and
10 degrees down, 5 degrees right,
is greater than 84 Candelas.

12. A device according to claim 11, wherein the light source has an output of less than about 45 lumens.

13. A device according to claim 12, wherein the light source has an output of less than about 40 lumens.

14. A device for creating a predetermined light output image distribution comprising:
a light source;
a lens having a plurality of collimation surfaces and a plurality of lens elements through which the light from the source, which has been substantially collimated by the collimation surfaces, is directed, wherein each lens element has a non-imaging radiant energy distribution surface that directs the light into a predetermined output image distribution, and wherein the non-imaging radiant energy distribution surface is of a complex non-uniform shape such that the surface is not a surface of revolution and not generated by sweeping or extruding, and wherein the surface can be generally represented by a continuous smooth surface.

15. A device according to claim 14, wherein the light source comprises at least one LED.

16. A device according to claim 14, wherein the output image distribution conforms to at least one light specification defined in United States Department of Transportation specification FMVSS 108.

17. A device according to claim 14, wherein the light output image distribution projects a recognizable shape.

18. A device according to claim 14, wherein the light source is red as defined by United States Department of Transportation specification FMVSS 108.

19. A device according to claim 14, wherein the light source is amber as defined by United States Department of Transportation specification FMVSS 108.

20. A device according to claim 14, wherein said lens is a complex non-uniform shape.

21. A device according to claim 1, wherein:
the light source has a total output of less than 30 Lumens; and
wherein the sum of the intensity measurements at:
5 degrees up, 0 degrees left,
5 degrees down, 0 degrees left,
0 degrees up, 5 degrees left,
0 degrees up, 0 degrees left, and
0 degrees up, 5 degrees right;
is greater than 380 Candelas; and
the sum of the intensity measurements at:
5 degrees up, 10 degrees left,
0 degrees up, 10 degrees left, and
5 degrees down, 10 degrees left;
is greater than 100 Candelas; and
the sum of the intensity measurements at:
5 degrees up, 10 degrees right,
0 degrees up, 10 degrees right, and
5 degrees down, 10 degrees right,
is greater than 100 Candelas; and
the sum of the intensity measurements at:
10 degrees up, 5 degrees left,
5 degrees up, 20 degrees left,
5 degrees down, 20 degrees left, and
10 degrees down, 5 degrees left,
is greater than 50 Candelas; and
the sum of the intensity measurements at:
10 degrees up, 5 degrees right,
5 degrees up, 20 degrees right,
5 degrees down, 20 degrees right, and
10 degrees down, 5 degrees right,
is greater than 50 Candelas.

22. A device according to claim 21, wherein the light from the source is pseudo collimated light.

23. A device according to claim 21, wherein the light source has an output of less than about 25 lumens.

24. A device according to claim 23, wherein the light source has an output of less than about 20 lumens.

* * * * *